(12) United States Patent
Wang et al.

(10) Patent No.: US 10,437,099 B2
(45) Date of Patent: Oct. 8, 2019

(54) BACKLIGHT MODULE, DISPLAY PANEL AND DISPLAY DEVICE

(71) Applicants: BOE TECHNOLOGY GROUP CO., LTD., Beijing (CN); Beijing BOE Display Technology Co., Ltd., Beijing (CN)

(72) Inventors: Fei Wang, Beijing (CN); Dan Wang, Beijing (CN); Yun Qiu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/706,423

(22) Filed: Sep. 15, 2017

(65) Prior Publication Data

US 2018/0203299 A1 Jul. 19, 2018

(30) Foreign Application Priority Data

Jan. 17, 2017 (CN) .......................... 2017 1 0031464

(51) Int. Cl.
*G02F 1/1335* (2006.01)
*F21V 8/00* (2006.01)

(52) U.S. Cl.
CPC ..... *G02F 1/133602* (2013.01); *G02B 6/0031* (2013.01); *G02F 1/13362* (2013.01);
(Continued)

(58) Field of Classification Search
CPC .... G02B 6/005; G02B 6/0055; G02B 6/0056; G02B 6/0058; G02B 6/0033–6/0036
See application file for complete search history.

(56) References Cited

U.S. PATENT DOCUMENTS

| 5,396,350 A | * | 3/1995 | Beeson | F21V 5/02 349/62 |
| 5,555,329 A | | 9/1996 | Kuper et al. | |

(Continued)

FOREIGN PATENT DOCUMENTS

| CN | 1169182 A | 12/1997 |
| CN | 1922516 A | 2/2007 |

(Continued)

OTHER PUBLICATIONS

Chinese Office Action dated Sep. 29, 2018, received for corresponding Chinese Application No. 201710031464.2.

*Primary Examiner* — Julie A Bannan
(74) *Attorney, Agent, or Firm* — Kinney & Lange, P.A.

(57) ABSTRACT

A backlight module comprises a light source, a light guide plate and at least one transparent light guide structure. Each transparent light guide structure comprises a first surface adjacent to a side of the light guide plate and a second surface far away from the light guide plate, a light emitted by the light source is directed into the first surface of the transparent light guide structure through the light guide plate. Each transparent light guide structure is configured to change a propagation direction of a first light in the light emitted by the light source, so that an emergence angle of the first light emitted from the second surface is smaller than an incidence angle of the first light incident from the first surface. The incidence angle of the first light onto the first surface is less than 90 degrees.

14 Claims, 6 Drawing Sheets

(52) U.S. Cl.
CPC .............. *G02F 1/133606* (2013.01); *G02F 2001/133607* (2013.01)

(56) References Cited

U.S. PATENT DOCUMENTS

| | | | |
|---|---|---|---|
| 5,761,355 A | 6/1998 | Kuper et al. | |
| 5,995,690 A * | 11/1999 | Kotz | G02B 6/001 385/129 |
| 6,011,602 A * | 1/2000 | Miyashita | G02B 6/0038 349/61 |
| 6,129,439 A * | 10/2000 | Hou | F21V 5/02 362/23.15 |
| 7,160,017 B2 | 1/2007 | Lee et al. | |
| 7,581,867 B2 | 9/2009 | Lee et al. | |
| 7,708,448 B2 * | 5/2010 | Lee | G02B 6/0036 362/620 |
| 8,081,273 B2 * | 12/2011 | Choo | G02F 1/133536 349/100 |
| 8,427,602 B2 * | 4/2013 | Mun | G02B 6/0056 349/65 |
| 9,075,179 B2 * | 7/2015 | Petcavich | G02B 5/0221 |
| 9,494,721 B2 * | 11/2016 | Nam | G02B 5/3058 |
| 9,885,821 B2 | 2/2018 | Ma et al. | |
| 2004/0080926 A1 * | 4/2004 | Chen | G02B 6/0023 362/609 |
| 2005/0185416 A1 | 8/2005 | Lee et al. | |
| 2005/0270798 A1 | 12/2005 | Lee et al. | |
| 2006/0250819 A1 | 11/2006 | Lee et al. | |
| 2007/0047260 A1 | 3/2007 | Lee et al. | |
| 2007/0252923 A1 * | 11/2007 | Hwang | G02B 6/0053 349/65 |
| 2007/0263139 A1 * | 11/2007 | Hwang | G02B 6/0056 349/96 |
| 2010/0208179 A1 * | 8/2010 | Chang | G02F 1/133512 349/110 |
| 2010/0208497 A1 * | 8/2010 | Song | B29D 11/00663 362/619 |
| 2011/0163066 A1 * | 7/2011 | Choi | B32B 37/226 216/36 |
| 2014/0029306 A1 * | 1/2014 | Sakamoto | G02B 6/0061 362/621 |
| 2015/0029744 A1 * | 1/2015 | Van Ostrand | G02B 5/0231 362/606 |
| 2016/0124133 A1 * | 5/2016 | Han | G02B 5/3058 349/43 |
| 2016/0170264 A1 | 6/2016 | Qin | |
| 2016/0195760 A1 * | 7/2016 | Cho | G02F 1/133606 362/19 |
| 2016/0216433 A1 * | 7/2016 | Lee | G02B 6/0036 |
| 2016/0349438 A1 | 12/2016 | Ma et al. | |
| 2017/0139101 A1 * | 5/2017 | Lee | G02B 6/005 |
| 2017/0192152 A1 * | 7/2017 | Choi | G02B 6/0036 |
| 2018/0149789 A1 * | 5/2018 | Choi | G02B 6/0018 |

FOREIGN PATENT DOCUMENTS

| | | |
|---|---|---|
| CN | 1965253 A | 5/2007 |
| CN | 103148453 A | 6/2013 |
| CN | 104880760 A | 9/2015 |

* cited by examiner

2

BACKLIGHT MODULE, DISPLAY PANEL AND DISPLAY DEVICE

CROSS-REFERENCE TO RELATED APPLICATION

This application claims the benefit of Chinese Patent Application No. CN201710031464.2 filed on Jan. 17, 2017 in the State Intellectual Property Office of China, the whole disclosure of which is incorporated herein by reference.

BACKGROUND

Technical Field

At least one embodiment of the present disclosure relates to a display technology field, more particularly, relates to a backlight module, a display panel, and a display device

Description of the Related Art

With the development of society, various display devices, such as mobile phone, computer, and TV, are more and more widely used in people's life and work. Although the display device provides a lot of convenience for people, it may lead to leakage of personal information.

In the relevant art, the display device generally comprises a backlight module and a display panel. The backlight module comprises a light source and a light guide plate. The light source is provided at a light input side of the light guide plate. The light guide plate is provided at a light input side of the display panel. The light source emits light around. The light directed into the light guide plate is uniformly transmitted into the display panel under the action of the light guiding plate, so as to lighten the display panel, thereby enabling the display panel to display an image.

In the relevant art, the light transmitted into the display panel through the light guide plate may be emitted from both sides of the display panel, so that a view angle of the display panel becomes larger. Thereby, privacy information is visible from both sides of the display panel when the privacy information is displayed on the display panel. As a result, it is more likely to cause disclosure of private information.

SUMMARY

The present disclosure has been made to overcome or alleviate at least one aspect of the above mentioned disadvantages.

According to at least one embodiment of the present disclosure, there is provided a backlight module, a display panel and a display device, so as to avoid disclosure of private information.

According to an exemplary embodiment of an aspect of the present disclosure, there is provided a backlight module comprising a light source, a light guide plate and at least one transparent light guide structure. Each transparent light guide structure comprises a first surface adjacent to a side of the light guide plate and a second surface far away from the light guide plate, and a light emitted by the light source is directed into the first surface of the transparent light guide structure through the light guide plate. Each transparent light guide structure is configured to change a propagation direction of a first light in the light emitted by the light source, so that an emergence angle of the first light emitted from the second surface is smaller than an incidence angle of the first light incident from the first surface. The incidence angle of the first light onto the first surface is less than 90 degrees.

According to an exemplary embodiment of the present disclosure, an area of the first surface is smaller than that of the second surface.

According to another exemplary embodiment of the present disclosure, a cross-section area of each transparent light guide structure is increased gradually from the first surface to the second surface; and each transparent light guide structure comprises at least one prism frustum sequentially superposed, or each transparent light guide structure comprises at least one circular truncated cone sequentially superposed, or a side surface of each transparent light guide structure located between the first surface and the second surface comprises an arc surface.

According to another exemplary embodiment of the present disclosure, the backlight module further comprises at least one microlens provided at a side of the at least one transparent light guide structure far away from the light guide plate, respectively, and the first light emitted from the second surface of each transparent light guide structure is directed into a corresponding microlens, so as to converge the first light.

According to another exemplary embodiment of the present disclosure, an arrangement density of the transparent light guide structure is gradually increased in a direction far away from the light source.

According to another exemplary embodiment of the present disclosure, a side surface of the transparent light guide structure located between the first surface and the second surface is provided with a first reflection layer which has a reflection surface adjacent to the side surface of the transparent light guide structure; and all other surfaces of the light guide plate except a light input surface and a light output surface thereof is provided with a second reflection layer which has a reflection surface adjacent to the light guide plate.

According to another exemplary embodiment of the present disclosure, the backlight module further comprises a transparent plate provided in parallel with the light guide plate and positioned between the at least one transparent light guide structure and the at least one microlens.

According to another exemplary embodiment of the present disclosure, the transparent plate and the at least one transparent light guide structure are integrated into a single structure.

According to an exemplary embodiment of another aspect of the present disclosure, there is provided a display panel comprising a substrate and at least one transparent light guide structure. Each transparent light guide structure comprises a first surface far away from the substrate and a second surface adjacent to the substrate. Each transparent light guide structure is configured to change a propagation direction of a first light incident from the first surface, so that an emergence angle of the first light emitted from the second surface is smaller than an incidence angle of the first light incident from the first surface. The incidence angle of the first light onto the first surface is less than 90 degrees.

According to an exemplary embodiment of the present disclosure, an area of the first surface is smaller than that of the second surface.

According to another exemplary embodiment of the present disclosure, a cross-section area of each transparent light guide structure is increased gradually from the first surface to the second surface; and each transparent light guide structure comprises at least one prism frustum sequentially superposed, or each transparent light guide structure comprises at least one circular truncated cone sequentially superposed, or a side surface of each transparent light guide structure located between the first surface and the second surface comprises an arc surface.

According to another exemplary embodiment of the present disclosure, on the side surface of the transparent light guide structure located between the first surface and the second surface is provided with a first reflection layer which has a reflection surface adjacent to the side surface of the transparent light guide structure.

According to another exemplary embodiment of the present disclosure, an arrangement density of the transparent light guide structure is gradually increased in a direction far away from a light source for emitting the first light.

According to another exemplary embodiment of the present disclosure, a wire grid polarizer is provided on a light output side of the substrate, a flat transparent layer is provided on the substrate provided with the wire grid polarizer, and a thin film transistor structure is provided on the substrate provided with the flat transparent layer; or a thin film transistor structure is provided on a light output side of the substrate, a wire grid polarizer is provided on a light input side of the substrate, and the at least one transparent light guide structure is provided on the substrate provided with the wire grid polarizer.

According to an exemplary embodiment of a further aspect of the present disclosure, there is provided a display device comprising the above backlight module.

According to an exemplary embodiment of a still further aspect of the present disclosure, there is provided a display device comprising the above display panel.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
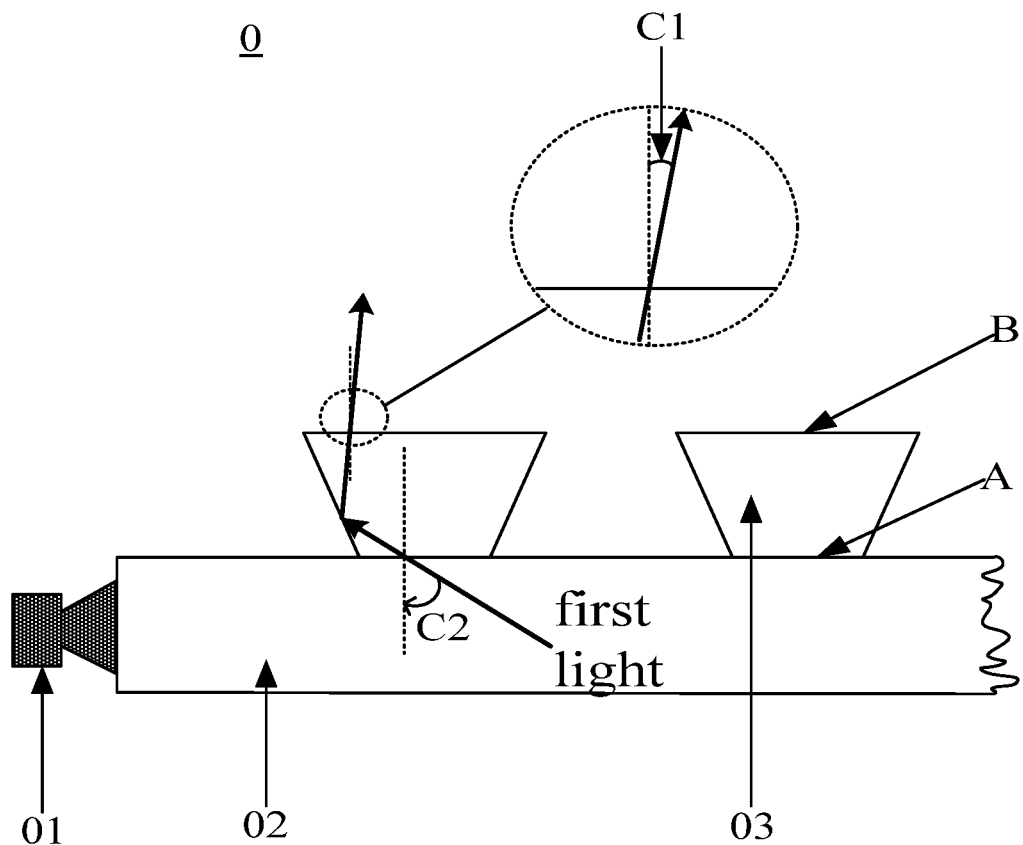
FIG. 1 is an illustrative local cross section view of a backlight module according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is an illustrative local cross section view of a backlight module 0 according to an exemplary embodiment of the present disclosure. As shown in FIG. 1, the backlight module 0 may comprise a light source 01, a light guide plate 02 and at least one transparent light guide structure 03.

In an embodiment, the at least one transparent light guide structure 03 is provided at a side of the light guide plate 02. Each transparent light guide structure 03 comprises a first surface A which is contact with the light guide plate 02, and a second surface B far away from the light guide plate 02. Although the backlight module 0 shown in FIG. 1 comprises only two transparent light guide structures 03, the present disclosure is not limited to this. It should be appreciated for those skilled in this art that the backlight module 0 may comprise three, four or more transparent light guide structures 03.

In an embodiment, the light emitted by the light source 01 may be directed into the first surface A of the transparent light guide structure 03 through the light guide plate 02. It should be appreciated that the backlight module 0 may be a vertical type backlight module or a side entry type backlight module, and an embodiment of the side entry type backlight module is shown in FIG. 1.

In an embodiment, each transparent light guide structure 03 is configured to change a propagation direction of a first light in the light emitted by the light source 01, so that an emergence angle C1 of the first light emitted from the second surface B is smaller than an incidence angle C2 of the first light incident from the first surface A. The incidence angle C2 of the first light onto the first surface A is less than 90 degrees.

In the backlight module according to an embodiment of the present disclosure, the transparent light guide structure is provided at the side of the light guide plate, the light emitted by the light source is directed into the first surface of the transparent light guide structure through the light guide plate. Since each transparent light guide structure is configured to change the propagation direction of the first light of the light emitted by the light source, the emergence angle of the first light emitted from the second surface is smaller than the incidence angle of the first light incident from the first surface. As a result, the transparent light guiding structure is capable of converging the first light with the incidence angle less than 90 degrees, so that the emergence angle of the first light emitted from the transparent light guiding structure to a display panel (see 21 of FIG. 9) becomes smaller, thereby reducing the quantity of the first light emitted from both edges of the display panel, and decreasing the degree of privacy information disclosure.

As shown in FIG. 1, it should be appreciated that the emergence angle C1 of the first light on the second surface B is an angle formed between a propagation direction of the first light emitted from the second surface B and a normal line (vertical to the second surface B) of the second surface B. The incidence angle C2 of the first light on the first surface A is an angle formed between a propagation direction of the first light incident into the first surface A and a normal line (vertical to the first surface A) of the first surface A. In an exemplary embodiment, an area of the first surface A may be smaller than that of the second surface B.

It should be appreciated for those skilled in this art that a part of the light incident into the light guide plate 02 from the light source 01 may undergo a total reflection in the light guide plate 02, the other part of the light may be emitted from a light output surface (adjacent to the transparent light guide structure) of the light guide plate 02 and be directed into the transparent light guide structure. In an embodiment, a refractive index of the transparent light guide structure 03 may be equal to that of the light guide plate 02, the first surface of the transparent light guide structure 03 may directly contact the light guide plate 02 or adhered to the light guide plate 02 through a transparent adhesive with a refractive index equal to that of the light guide plate 02, so that the light undergoing the total reflection in the light guide plate 02 may enter into the transparent light guide structure at the contact or adhere location. In another embodiment, a plurality of net dots may be provided on the light output surface of the light guide plate 02, the transparent light guide structure 03 may be provided near the light guide plate 02, and the first surface of the transparent light guide structure may contact or not contact the light guide plate 02. In this way, the light transmitted in the light guide plate 02 may be emitted from the light output surface of the light guide plate 02 through the net dots, and directed into the transparent light guide structure.

With this configuration, the backlight module according to the embodiment of the present disclosure is provided with the transparent light guide structure, and it may reduce the number of components of the backlight module. Therefore, the light consumption in the backlight module is less, the intensity of the light emitted from the backlight module is increased, and the utilization rate of the light emitted by the light source is higher.

In an exemplary embodiment, FIG. 1 shows an illustrative axial cross section view of the transparent light guide structure 03. As shown in FIG. 1, a cross-section area of each transparent light guide structure 03 is increased gradually from the first surface A (the lower surface of FIG. 1) to the second surface B (the upper surface of FIG. 1). Each transparent light guide structure 03 of FIG. 1 may be shaped as a prism frustum, and the area of the first surface A of the prism frustum is smaller than that of the second surface B of the prism frustum. In an alternative embodiment, each transparent light guide structure 03 of FIG. 1 may be shaped as a circular truncated cone, and the area of the first surface A of the circular truncated cone is smaller than that of the second surface B of the circular truncated cone.

Figure 2:
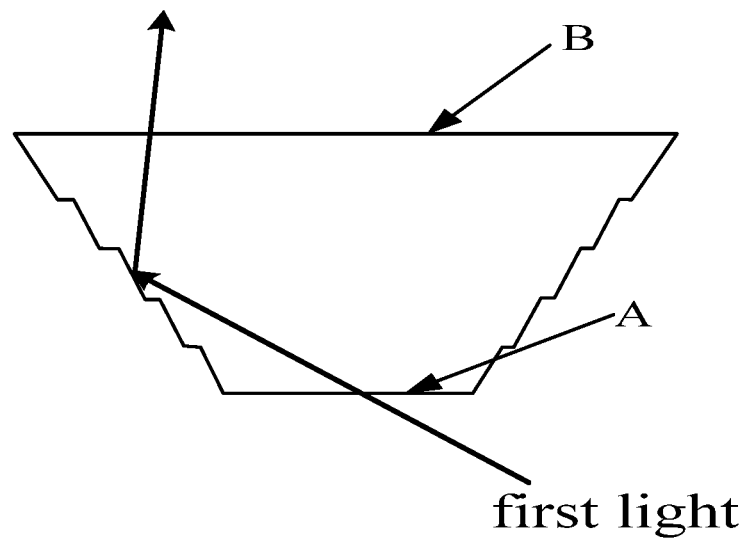
FIG. 2 is an illustrative axial cross section view of a transparent light guide structure according to an exemplary embodiment of the present disclosure.
Figure 3:
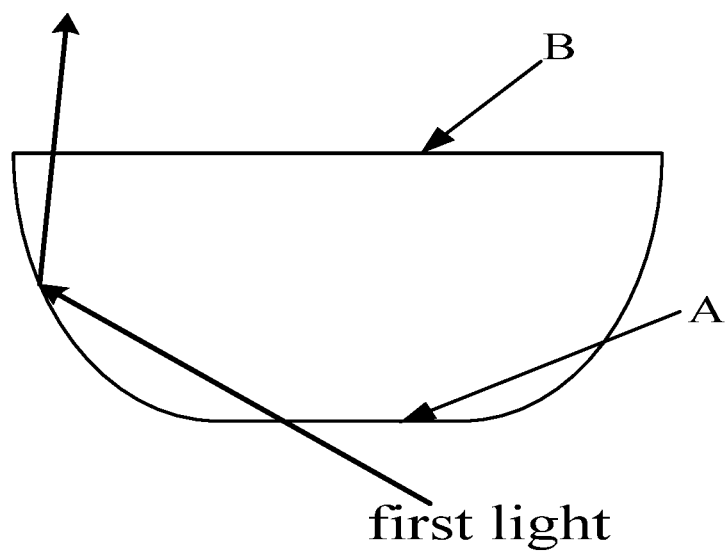
FIG. 3 is an illustrative axial cross section view of a transparent light guide structure according to another exemplary embodiment of the present disclosure.

As shown in FIGS. 1-3, it should be appreciated that, in an embodiment of the present disclosure, the transparent light guide structure may comprise an inverted prism frustum or an inverted circular truncated cone, and the first surface A at the lower portion thereof is provided near the light guide plate, and the second surface B is provided far away from the light guide plate.

FIG. 2 is an illustrative axial cross section view of a transparent light guide structure 03 according to an exemplary embodiment of the present disclosure. In an exemplary embodiment, as shown in FIG. 2, the transparent light guide structure 03 comprises a plurality of prism frustums or circular truncated cones sequentially superposed, and the cross-section area of the transparent light guide structure is increased gradually from the first surface A to the second surface B. In this way, the axial cross section of the transparent light guide structure has a ladder shape. The first light of the light emitted by the light source 01 is directed into the transparent light guide structure from the first surface A, then reflected by the side surface of the transparent light guiding structure 03, and finally led out the transparent light guiding structure from the second surface B. In addition, the emergence angle of the first light emitted from the second surface B is smaller than the incidence angle of the first light incident from the first surface A.

FIG. 3 is an illustrative axial cross section view of a transparent light guide structure 03 according to another exemplary embodiment of the present disclosure. In an exemplary embodiment, as shown in FIG. 3, the area of the first surface A of the transparent light guide structure 03 is smaller than that of the second surface B of the transparent light guide structure 03, the cross-section area of the transparent light guide structure 03 is increased gradually from the first surface to the second surface. A side surface of the transparent light guide structure 03 located between the first surface and the second surface comprises an arc surface protruding outward. In this way, the side surface of the transparent light guide structure 03 is curved, and the curved side surface is bent toward the outside of the transparent light guide structure 03. The first light of the light emitted by the light source 01 is directed into the transparent light guide structure from the first surface A, then deflected by the side surface of the transparent light guide structure 03, and finally led out the transparent light guiding structure from the second surface B. In addition, the emergence angle of the first light emitted from the second surface B is smaller than the incidence angle of the first light incident from the first surface A.

Figure 4:
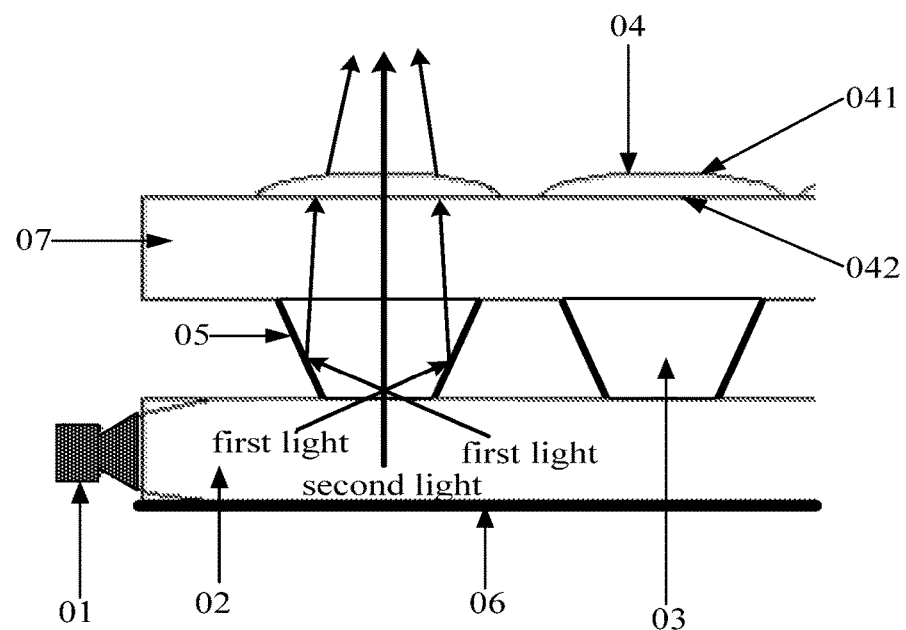
FIG. 4 is an illustrative local cross section view of a backlight module according to another exemplary embodiment of the present disclosure.

FIG. 4 is an illustrative local cross section view of a backlight module 0 according to another exemplary embodiment of the present disclosure. As shown in FIG. 4, based on FIG. 1, the backlight module 0 may further comprise at least one microlens. The at least one microlens is provided at a side of the at least one transparent light guide structure 03 far away from the light guide plate 02, respectively. The first light emitted from the second surface of each transparent light guide structure 03 is further directed into the respective microlens. Each microlens 04 is configured to converge the light incident into the microlens 04 from a side of the microlens 04 adjacent to the transparent light guide structure 03. In an exemplary embodiment, each microlens 04 may comprise a convex surface 041 and a flat surface 042. The flat surface 042 may be parallel to the light guide plate 02 and provided adjacent to the light guide plate 02. The convex surface 041 and the flat surface 042 in each microlens 04 may be opposite to each other. Since the flat surface 042 of the microlens 04 is provided adjacent to the light guide plate 02, the first light may be further converged by the microlens 04. Thus, the emergence angle of the light incident into the display panel is further reduced, and the light emitted from both edges of the display panel is reduced. In an embodiment, the microlens 04 may be an ordinary convex lens or a Fresnel lens.

As shown in FIG. 4, the light emitted from the light source may further comprise a second light. An incidence angle of the second light on the first surface A may be equal to 90 degrees, that is, a propagation direction of the second light is perpendicular to the first surface A. The second light may sequentially be transmitted through the transparent light guide structure 03 and the microlens 04, the propagation direction of the second light emitted from the microlens 04 is perpendicular to the light guide plate 02. In this way, the light directed into the transparent light guide structure 03 from the first surface A comprises the first light with an incidence angle less than 90 degrees and the second light with an incidence angle equal to 90 degrees.

As shown in FIG. 4, a layer of microlens 04 comprising at least one microlens is provided on a side of the transparent light guide structure 03 far away from the light guide plate 02. In another embodiment, a plurality of layers of microlenses may be provided on the side of the transparent light guide structure 03 far away from the light guide plate 02, and each layer of microlenses may be configured to converge the light emitted from the transparent light guide structure.

Figure 5:
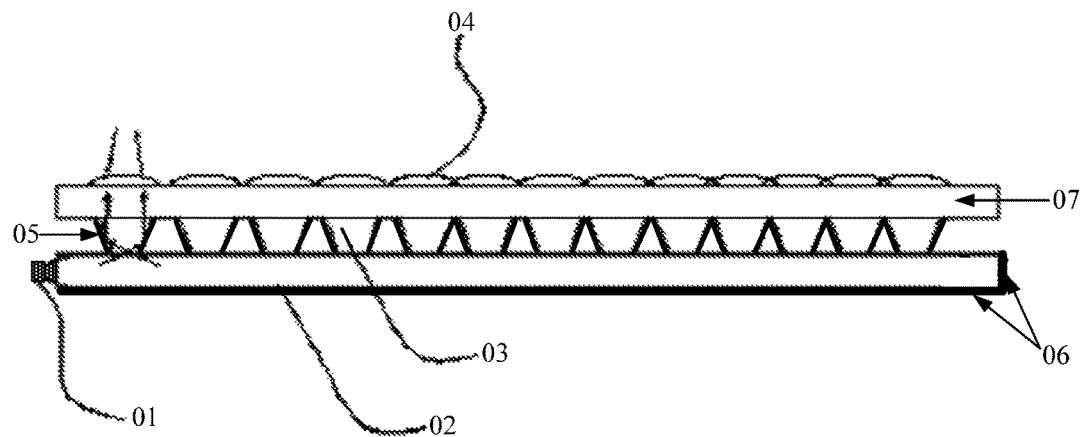
FIG. 5 is an illustrative cross section view of a backlight module according to yet another exemplary embodiment of the present disclosure.

FIG. 5 is an illustrative cross section view of a backlight module 0 according to yet another exemplary embodiment of the present disclosure. As shown in FIG. 5, at least one transparent light guide structure 03 may be arranged to correspond to at least one microlens 04, respectively, so that the light emitted from the second surface of each transparent light guide structure 03 may be directed into the flat surface of a corresponding microlens 04. Optionally, the propagation direction of light emitted from the convex surface of the microlens 04 may be perpendicular to the light guide plate 02. When the propagation direction of light emitted from the convex surface of the microlens 04 is perpendicular to the light guide plate 02, the light transmitted into the display panel (see 21 of FIG. 9) is all perpendicular to the display panel, and the light emitted from the display panel is collimated light. In this case, almost no light is emitted from both edges of the display panel, improving the anti-peeping performance of the display panel.

In an exemplary embodiment, as shown in FIG. 5, in order to ensure that the light emitted from the backlight module to the display panel is more uniform, and further ensure that the light emitted from the light output side of the display panel is more uniform, an arrangement density of the transparent light guide structure 03 is gradually increased in a direction far away from the light source 01. That is to say, the arrangement density of the transparent light guide structure adjacent to the light source is smaller than the arrangement density of the transparent light guide structure far away from the light source. In this way, in a region near the light source 01, less transparent light guiding structure 03 and less microlens 04 may be provided; on the other hand, in a region far away from the light source 01, more transparent light guiding structure 03 and more microlens 04 may be provided. Optionally, the arrangement density of the transparent light guide structure 03 may be provided to be increased regularly.

Referring to FIGS. 4-5, in order to further improve the utilization rate of light, and in order that the light emitted by the light source 01 is directed into the display panel as much as possible, a first reflection layer 05 may be provided on the side surface (that is, the side surface of the prism frustum or the circular truncated cone) of the transparent light guide structure between the first surface and the second surface, a reflection surface of the first reflection layer 05 may be provided adjacent to the side surface of the transparent light guide structure 03. If there is light emitted from the side surface of the transparent light guide structure 03, the light emitted from the side surface of the transparent light guide structure 03 will be reflected back into the transparent light guide structure 03 under the action of the reflecting surface of the first reflection layer 05, and emitted out from the second surface of the transparent light guide structure 03.

In an embodiment, the light guide plate 02 may have a plate-like structure, the light guide plate 02 has two larger surfaces parallel to the display panel and a plurality of smaller surfaces perpendicular to the display panel. The two larger surfaces of the light guide plate 02 are acted as upper and lower surfaces of the entire light guide plate 02, the plurality of smaller surfaces are acted as side surfaces of the light guide plate 02. All other surfaces of the light guide plate 02 except the light input surface (adjacent to the light source 01) and the light output surface (adjacent to the transparent light guide structure 03) are provided with a second reflection layer 06 which has a reflection surface adjacent to the light guide plate. The second reflection layer may prevent the light transmitted into the light guide plate from being emitted from other surfaces adjacent to the first surface, thereby improving the utilization rate of the light.

When the backlight module is a vertical type backlight module, the light source may be provided on a surface of the light guide plate opposite to the transparent light guide structure 03 (for example, the lower surface of the light guide plate 02 as shown in FIG. 1, 4-5). In addition, all side surfaces of the light guide plate except the upper and lower surfaces thereof may be provided with the second reflection layer. When the backlight module is a side entry type backlight module, the light source may be provided on a side surface of the light guide plate (for example, the left side surface of the light guide plate 02 shown in FIGS. 1 and 4-5). In addition, the side surface of the light guide plate without the light source and a side surface (lower surface) far away from the transparent light guide structure may be provided with the second reflection layer. The embodiment of the present disclosure takes the side entry type backlight module as an example of the backlight module.

In an exemplary embodiment, referring to FIGS. 4 and 5 again, the backlight module 0 may further comprise a transparent plate 07 provided in parallel with the light guide plate 02. The at least one transparent light guide structure 03 each is provided at a side of the transparent plate 07 adjacent to the light guide plate 02, the at least one microlens 04 each is provided at a side of the transparent plate 07 far away from the light guide plate 02. That is, the transparent plate is positioned between the at least one transparent light guide structure and the at least one microlens. The at least one transparent light guide structure 03 and the at least one microlens 04 may be both fixedly mounted on the transparent plate 07. The transparent plate 07 may be used to fix the at least one transparent light guide structure 03 and the at least one microlens 04. In an exemplary embodiment, the transparent plate 07 and the at least one transparent light guide structure 03 are integrated into a single structure.

It should be appreciated that the light source 01 may be a LED (Light Emitting Diode) or other light emitting device. The light emitted by the light source 01 may undergo total reflection in the light guide plate 02, and enter into the transparent light guide structure 03 from the first surface at the location where the light guide plate 02 is in contact with the transparent light guide structure 03. In the backlight module according to an embodiment of the present disclosure, at the side of the light guide plate is provided with the transparent light guide structure, and the light emitted by the light source may be transmitted into the first surface of the transparent light guide structure through the light guide plate. Since each transparent light guide structure is configured to change the propagation direction of the first light in the light emitted by the light source, the emergence angle of the first light emitted from the second surface is smaller than the incidence angle of the first light incident from the first surface. As a result, the transparent light guiding structure is capable of converging the first light with an incidence angle less than 90 degrees, so that the emergence angle of the first light emitted from the transparent light guiding structure to a display panel becomes smaller, thereby reducing the quantity of the first light emitted from both edges of the display panel, and decreasing the degree of privacy information disclosure.

Figure 6:
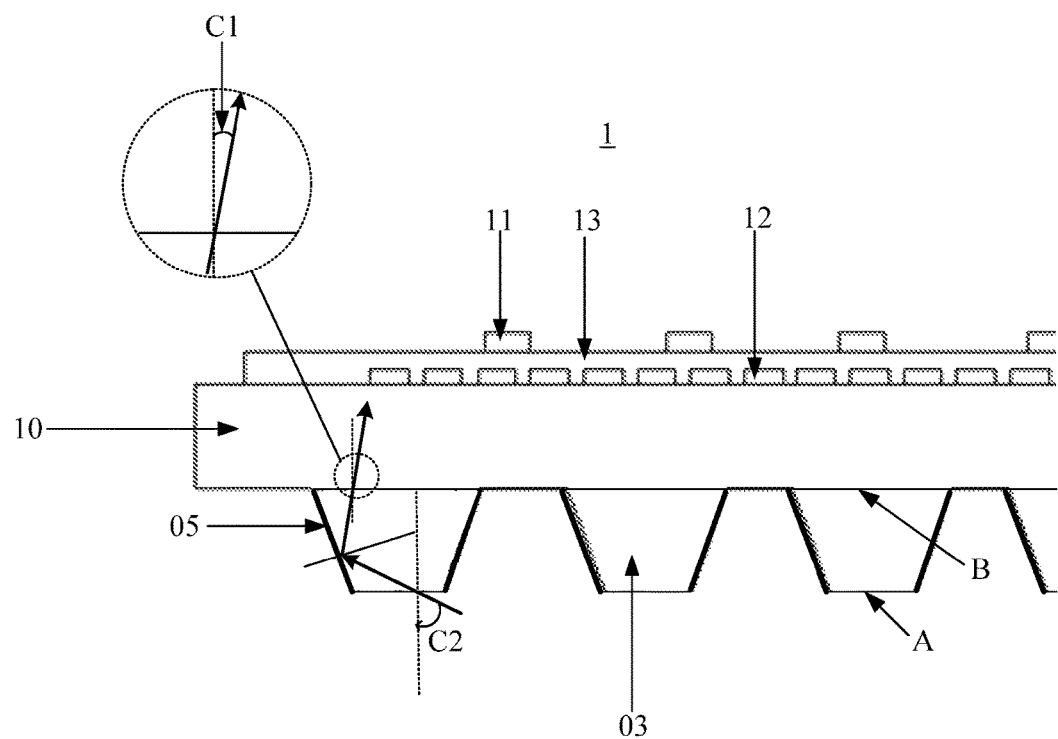
FIG. 6 is an illustrative local cross section view of a display panel according to an exemplary embodiment of the present disclosure.

FIG. 6 is an illustrative local cross section view of a display panel according to an exemplary embodiment of the present disclosure. As shown in FIG. 6, the display panel 1 may comprise a substrate 10 and at least one transparent light guide structure 03 provided at a light input side of the substrate 10.

In an exemplary embodiment, each transparent light guide structure 03 comprises a first surface A far away from the substrate 10 and a second surface B adjacent to the substrate 10. Each transparent light guide structure 03 is configured to change a propagation direction of a first light incident from the first surface A, so that an emergence angle C1 of the first light emitted from the second surface B is smaller than an incidence angle C2 of the first light incident from the first surface A, the incidence angle C2 of the first light on the first surface A is less than 90 degrees.

In an exemplary embodiment, the transparent light guide structure and the substrate may be integrated into a single structure.

In the display panel according to an embodiment of the present disclosure, the light input side of the substrate is provided with the transparent light guide structure, and each transparent light guide structure is configured to change the propagation direction of the first light, so that the emergence angle of the first light emitted from the second surface is smaller than the incidence angle of the first light incident from the first surface. As a result, the transparent light guiding structure is capable of converging the first light with an incidence angle less than 90 degrees, so that the emergence angle of the light emitted from the transparent light guiding structure becomes smaller, thereby reducing the quantity of the light emitted from both edges of the display panel, and decreasing the degree of privacy information disclosure.

As shown in FIG. 6, it should be appreciated that the emergence angle C1 of the first light on the second surface B is an angle formed between a propagation direction of the first light emitted from the second surface B and a normal line (vertical to the second surface) of the second surface B. The incidence angle C2 of the first light on the first surface A is an angle formed between a propagation direction of the first light injected into the first surface A and a normal line (vertical to the first surface) of the first surface A. In an exemplary embodiment, an area of the first surface A may be smaller than that of the second surface B.

In an exemplary embodiment, FIG. 6 shows the axial cross section view of the transparent light guide structure 03. As shown in FIG. 6, a cross-section area of each transparent light guide structure 03 is increased gradually from the first surface A (the lower surface of FIG. 6) to the second surface B (the upper surface of FIG. 6). Each transparent light guide structure 03 of FIG. 6 may be shaped as a prism frustum, and the area of the first surface A of the prism frustum is smaller than that of the second surface B of the prism frustum. In an alternative embodiment, each transparent light guide structure 03 of FIG. 6 may be shaped as a circular truncated cone, and the area of the first surface A of the circular truncated cone is smaller than that of the second surface B of the circular truncated cone. In an exemplary embodiment, the transparent light guide structure 03 of FIG. 6 may comprise the inverted prism frustum or the inverted circular truncated cone as shown in FIG. 2. In an alternative embodiment, as shown in FIG. 3, a side surface of the transparent light guide structure 03 located between the first surface and the second surface comprises an arc surface protruding outward. In an exemplary embodiment, the substrate 10 and the at least one transparent light guide structure 03 may be integrated into a single structure.

As shown in FIGS. 2-3 and 6, it should be appreciated that the transparent light guide structure according to an embodiment of the present disclosure may comprise the inverted prism frustum or the inverted circular truncated cone, the first surface A at the lower portion thereof is provided far away from the substrate, and the second surface B is provided adjacent to the substrate.

In an exemplary embodiment, as shown in FIG. 6, in order to further improve the utilization rate of light, and in order that the light emitted by the light source is directed into the display panel as much as possible, a first reflection layer 05 may be provided on the side surface (that is, the side surface of the prism frustum or the circular truncated cone) of the transparent light guide structure, and a reflection surface of the first reflection layer 05 may be provided adjacent to the side surface of the transparent light guide structure 03. If there is light emitted from the side surface of the transparent light guide structure 03, the light emitted from the side surface of the transparent light guide structure 03 will be reflected back into the transparent light guide structure 03 under the action of the reflecting surface of the first reflection layer 05, and emitted out from the second surface of the transparent light guide structure 03.

In an embodiment, in addition to the first light, the light incident into the transparent light guide structure 03 from the first surface A may further comprise a second light. The incidence angle of the second light on the first surface A may be equal to 90 degrees, that is, the second light may be perpendicularly transmitted into the first surface A.

Figure 7:
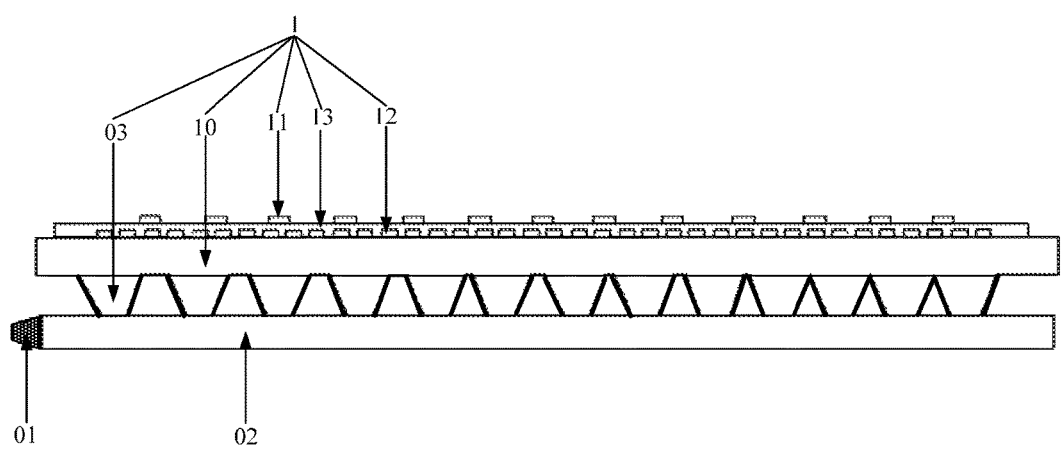
FIG. 7 is an illustrative local cross section view of a display panel according to another exemplary embodiment of the present disclosure.

FIG. 7 is an illustrative local cross section view of a display panel 1 according to another exemplary embodiment of the present disclosure. As shown in FIG. 7, a backlight module may be provided at a light input side of the display panel 1. The backlight module may comprise a light source 01 and a light guide plate 02. A substrate 10 of the display panel 1 may be provided adjacent to the backlight module. The backlight module may be a side entry type backlight module or a vertical type backlight module. FIG. 7 takes the side entry type backlight module as an example of the backlight module. When the backlight module is the vertical type backlight module, the light source may be provided on a surface of the light guide plate (for example, the lower surface of the light guide plate 02 in FIG. 7 which is referred as a light input side). When the backlight module is the side entry type backlight module, the light source may be provided on a side surface of the light guide plate (for example, the left side surface of the light guide plate 02 in FIG. 7 which is referred as a light input side).

It should be appreciated for those skilled in this art that a part of the light directed into the light guide plate 02 from the light source 01 may undergo a total reflection in the light guide plate 02, the other part of the light may be emitted from a light output surface (adjacent to the display panel) of the light guide plate 02 and be directed into the transparent light guide structure 03 of the display panel 1. In an embodiment, a refractive index of the transparent light guide structure 03 may be equal to that of the light guide plate 02, the first surface of the transparent light guide structure 03 may directly contact the light guide plate 02 or adhered to the light guide plate 02 through a transparent adhesive with a refractive index equal to that of the light guide plate 02, so that the light undergoing the total reflection in the light guide plate 02 may enter into the transparent light guide structure 03 at the contact or adhere location. In another embodiment, a plurality of net dots may be provided on the light output surface of the light guide plate 02, the transparent light guide structure 03 may be provided adjacent to the light guide plate 02. In this way, the first surface of the transparent light guide structure 03 may contact or not contact the light guide plate 02, the light transmitted in the light guide plate 02 may be emitted from the light output surface of the light guide plate 02 through the net dots, and directed into the transparent light guide structure 03.

In an exemplary embodiment, as shown in FIG. 7, in order to ensure that the light emitted from the backlight module to the display panel is more uniform, and further ensure that the light emitted from the light output side of the display panel is more uniform, an arrangement density of the transparent light guide structure 03 is gradually increased in a direction far away from the light source 01. That is to say, the arrangement density of the transparent light guide structure 03 adjacent to the light source 01 is smaller than the arrangement density of the transparent light guide structure 03 far away from the light source 01. In this way, in a region near the light source 01, less transparent light guiding structure 03 may be provided; on the other hand, in a region far away from the light source 01, more transparent light guiding structure 03 may be provided. Optionally, the arrangement density of the transparent light guide structure 03 may be provided to be increased regularly.

Referring to FIGS. 6 and 7, the substrate 10 may be a substrate in the display panel 1 provided adjacent to the backlight module, for example, the substrate 10 may be an array substrate suitable for a display device. A WGP (Wire Grid Polarizer) 12 is provided on a light output side of the substrate 10, a flat transparent layer 13 is provided on the substrate 10 provided with the wire grid polarizer 12, and a thin film transistor structure 11 is provided on the substrate 10 provided with the flat transparent layer 13.

In an embodiment, the WGP 12 may include a plurality of intersecting metal wires to form a metal mesh structure. The metal mesh structure may have a sub-wavelength space, that is, the distance between any two adjacent metal wires may be less than the wavelength of the light emitted by the light source. Since the WGP 12 provided on the light output side of the substrate 10 is acted as a polarizer, the display panel needs to include only a single polarizer. In addition, the WGP 12 has a smaller thickness, thereby reducing the thickness of the display panel.

Figure 10:
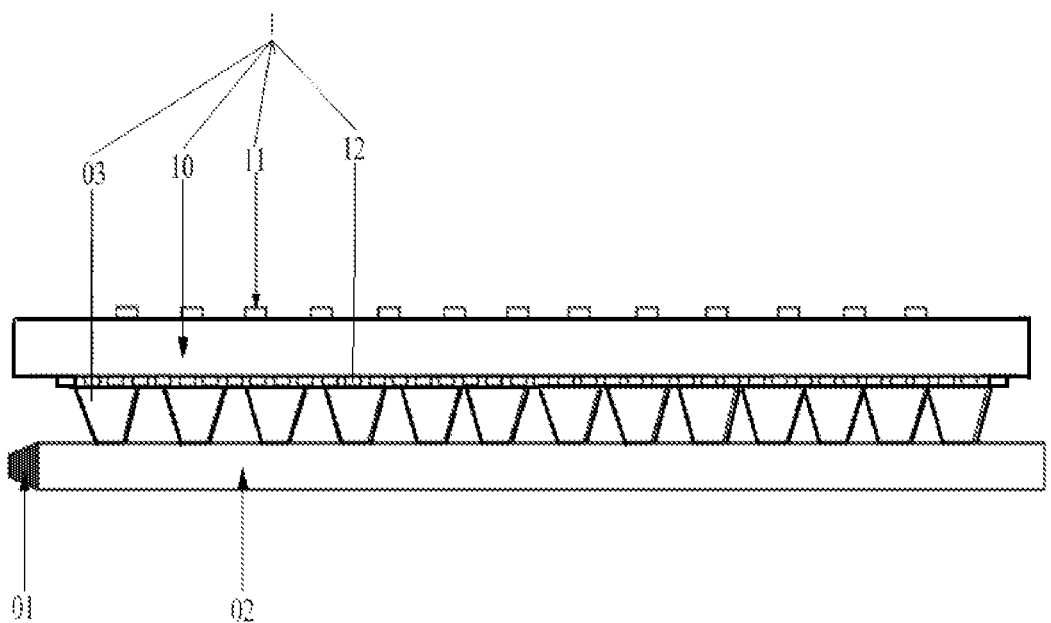
FIG. 10 is an illustrative local cross section view of a display panel according to still another exemplary embodiment of the present disclosure.

FIG. 10 is an illustrative local cross section view of a display panel according to still another exemplary embodiment of the present disclosure.

Referring to FIG. 10, in an embodiment, the WGP 12 may not be provided on the light output side of the substrate 10, and the WGP 12 may not be provided with the flat layer, but only the thin film transistor structure 11 is provided on the light output side of the substrate 10. In an embodiment, the WGP 12 may be provided on the light output side of the substrate 10, and the transparent light guide structure 03 may be provided on the substrate 10 provided with the WGP 12.

In the display panel according to an embodiment of the present disclosure, the light input side of the substrate is provided with the transparent light guide structure, and each transparent light guide structure is configured to change the propagation direction of the first light directed into the transparent light guide structure from the first surface thereof, so that the emergence angle of the first light emitted from the second surface is smaller than the incidence angle of the first light incident from the first surface. As a result, the transparent light guiding structure is capable of converging the first light with an incidence angle less than 90 degrees, so that the emergence angle of the first light emitted from the transparent light guiding structure becomes smaller, thereby reducing the quantity of the first light emitted from both edges of the display panel, and decreasing the degree of privacy information disclosure.

Figure 8:
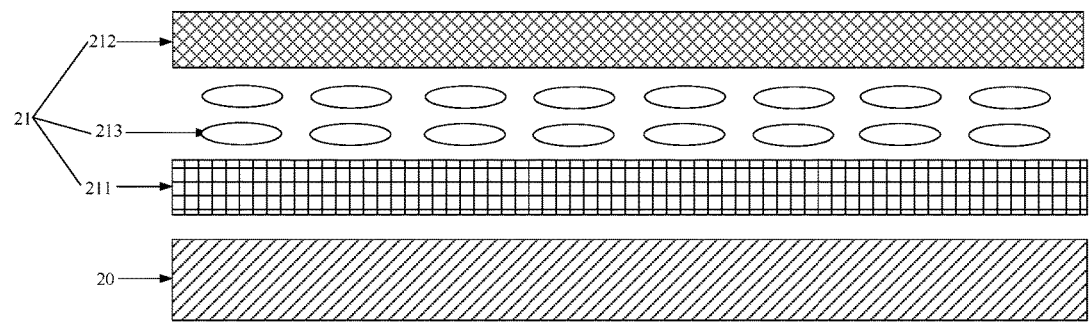
FIG. 8 is an illustrative cross section view of a display device according to an exemplary embodiment of the present disclosure.
Figure 9:
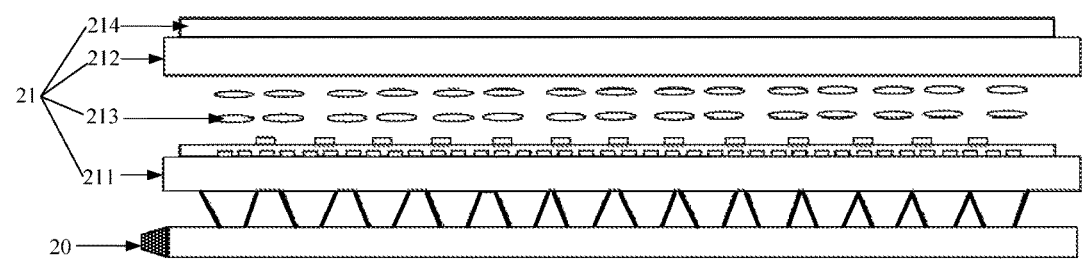
FIG. 9 is an illustrative cross section view of a display device according to another exemplary embodiment of the present disclosure.

FIG. 8 is an illustrative cross section view of a display device 2 according to an exemplary embodiment of the present disclosure; and FIG. 9 is an illustrative cross section view of a display device 2 according to another exemplary embodiment of the present disclosure. As shown in FIG. 8, the display device 2 may comprise a backlight module 20 and a display panel 21. The display panel 21 may comprise an array substrate 211 and a color film substrate 212 provided opposite to each other and liquid crystals 212 provided between the array substrate 211 and the color film substrate 213.

In an embodiment, the backlight module 20 may comprise the backlight module 0 shown in FIG. 1, 4 or 5. In this case, the display panel 21 may be the same as a display panel in related technology. In this condition, two polarizers may be provided on two sides of the display panel (that is, a light input side of the array substrate and a light output side of the color film substrate). In another embodiment, for example, in the display device 2 as shown in FIG. 9, the display panel 21 may comprise the display panel shown in FIG. 6 or 7. At least one transparent light guide structure is provided at the light input side of the substrate of the array substrate 211, and a polarizer 214 is provided at the light output side of the color film substrate 212. The backlight module 20 may comprise only the light guide plate and the light source, the light output surface of the light guide plate may be provided with or without net dots. Optionally, other surfaces of the light guide plate except the light input surface and the light output surface each may be provided with a reflection layer. In this case, it may reduce components in the backlight module. Therefore, the light consumption in the backlight module is less, the intensity of the light emitted from the backlight module is higher, and the utilization rate of the light emitted by the light source is higher.

The display device may comprise any product or component with display function, such as liquid crystal display panel, electronic paper, OLED (Organic Light-Emitting Diode) panel, mobile phone, panel computer, TV, display, notebook computer, digital photo frame, navigational instrument, etc. But the embodiment of the invention does not make any limit to this. That is, the embodiments of the backlight module, the embodiments of the display panel and the embodiments of the display device of the present disclosure may be referenced to each other, and the embodiments of the present disclosure does not make any limit to this.

In the backlight module, the display panel and the display device according to at least one embodiment of the present disclosure, at the side of the light guide plate is provided with the transparent light guide structure, and the light emitted by the light source may be directed into the first surface of the transparent light guide structure through the light guide plate. Since each transparent light guide structure is configured to change the propagation direction of the first light in the light emitted by the light source, the emergence angle of the first light emitted from the second surface is smaller than the incidence angle of the first light incident from the first surface. As a result, the transparent light guiding structure is capable of converging the first light with an incidence angle less than 90 degrees, so that the emergence angle of the first light emitted from the transparent light guiding structure to a display panel becomes smaller, thereby reducing the quantity of the first light emitted from both sides of the display panel, and decreasing the degree of privacy information disclosure.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display panel comprising:
   a substrate;
   a wire grid polarizer provided on a light output side of the substrate;
   a flat transparent layer provided on the substrate provided with the wire grid polarizer, the wire grid polarizer being provided between the substrate and the flat transparent layer; and
   a thin film transistor structure provided on a side of the flat transparent layer remote from the substrate,
   wherein the wire grid polarizer comprises a plurality of intersecting metal wires that form a metal mesh structure.

2. The display panel according to claim 1, further comprising at least one transparent light guide structure provided on a light input side of the substrate,
   wherein each transparent light guide structure comprises a first surface remote from the substrate and a second surface adjacent to the substrate;
   wherein each transparent light guide structure is configured to change a propagation direction of a first light incident from the first surface, so that an emergence angle of the first light emitted from the second surface is smaller than an incidence angle of the first light incident from the first surface, and
   wherein the incidence angle of the first light onto the first surface is less than 90 degrees.

3. The display panel according to claim 2, wherein an area of the first surface is smaller than that of the second surface.

4. The display panel according to claim 3,
   wherein a cross-section area of each transparent light guide structure increases gradually from the first surface to the second surface; and
   wherein each transparent light guide structure comprises at least one prism frustum sequentially superposed; or
   each transparent light guide structure comprises at least one circular truncated cone sequentially superposed; or
   a side surface of each transparent light guide structure between the first surface and the second surface comprises an arc surface.

5. The display panel according to claim 2,
   wherein a first reflection layer is provided on a side surface of the transparent light guide structure between the first surface and the second surface, the first reflection layer having a reflection surface adjacent to the side surface of the transparent light guide structure.

6. The display panel according to claim 2,
   wherein an arrangement density of the transparent light guide structure increases gradually in a direction remote from a light source for emitting the first light.

7. A display device comprising the display panel according to claim 1.

8. A display panel comprising:
   a substrate;
   a thin film transistor structure provided on a light output side of the substrate;
   a wire grid polarizer provided on a light input side of the substrate; and
   at least one transparent light guide structure provided on a side of the wire grid polarizer remote from the substrate, the wire grid polarizer being provided between the substrate and the at least one transparent light guide structure,
   wherein the wire grid polarizer comprises a plurality of intersecting metal wires that form a metal mesh structure.

9. The display panel according to claim 8,
   wherein each transparent light guide structure comprises a first surface remote from the substrate and a second surface adjacent to the substrate;
   wherein each transparent light guide structure is configured to change a propagation direction of a first light incident from the first surface, so that an emergence angle of the first light emitted from the second surface is smaller than an incidence angle of the first light incident from the first surface, and
   wherein the incidence angle of the first light onto the first surface is less than 90 degrees.

10. The display panel according to claim 9, wherein an area of the first surface is smaller than that of the second surface.

11. The display panel according to claim 10,
    wherein a cross-section area of each transparent light guide structure increases gradually from the first surface to the second surface; and
    wherein each transparent light guide structure comprises at least one prism frustum sequentially superposed; or
    each transparent light guide structure comprises at least one circular truncated cone sequentially superposed; or a side surface of each transparent light guide structure between the first surface and the second surface comprises an arc surface.

12. The display panel according to claim 9, wherein a first reflection layer is provided on a side surface of the transparent light guide structure between the first surface and the second surface, the first reflection layer having a reflection surface adjacent to the side surface of the transparent light guide structure.

13. The display panel according to claim 9, wherein an arrangement density of the transparent light guide structure is gradually increased in a direction remote from a light source for emitting the first light.

14. A display device comprising the display panel according to claim 8.

* * * * *